United States Patent [19]
Iten

[11] 3,709,599
[45] Jan. 9, 1973

[54] LASER DOPPLER FLOW PROBE WITH HIGH SPATIAL RESOLUTION
[75] Inventor: Paul D. Iten, Luzern, Switzerland
[73] Assignee: Aktiengesellschaft Brown, Boveri & Cie, Baden, Switzerland
[22] Filed: Nov. 10, 1970
[21] Appl. No.: 88,399

[30] Foreign Application Priority Data
    Nov. 21, 1969  Switzerland..................17346/69

[52] U.S. Cl......................................356/28, 356/103
[51] Int. Cl................................................G01p 5/00
[58] Field of Search.........356/28, 4.5, 103; 250/207, 250/214

[56] References Cited
    UNITED STATES PATENTS
    3,510,662  5/1970  Eberhardt.........................250/207
    3,516,751  6/1970  Fruengel..............................356/4

OTHER PUBLICATIONS
Foreman et al.: IEEE Journal of Quantrum Electronics, Vol. QE-2, No. 8, August, 1966, pages 260–266.

Primary Examiner—Ronald L. Wibert
Assistant Examiner—F. L. Evans
Attorney—Pierce, Scheffler & Parker

[57] ABSTRACT

An arrangement for microscopic measurement of velocities in a flow field comprises a laser beam of a predetermined frequency which is focussed on a selected volume of the fluid flowing in a field to produce an unscattered as well as a scattered component beam. The two component beams are directed onto a photodetector which mixes them and produces a corresponding electrical heterodyne signal which, after amplification and passage through a band-pass filter, is applied to an amplitude discriminator to delete all signals below a preselected amplitude level and thereby correspondingly improve the spatial resolution of the volume of fluid desired to be measured. The output of the discriminator is then applied to a frequency measuring instrument.

3 Claims, 2 Drawing Figures

LASER DOPPLER FLOW PROBE WITH HIGH SPATIAL RESOLUTION

The present invention relates to an improved method for the microscopic measurement of the velocities in flow fields by means of a laser Doppler probe.

Laser Doppler flow probes serve for the microscopic examination of velocity fields, for example, for boundary-layer measurements, in wind tunnels or for the flow of gases or liquids. They are distinguished from the conventional measuring instruments, such as Pitot tubes and the like, in that they are contact free and so measure without disturbing the velocity field, and in addition permit the local velocity distribution to be determined in microscopic regions.

The principle on which a laser Doppler probe is based is as follows:

The beam of light from a continuous-wave laser is focused on the region of the flow field to be examined. As a result of the moving particles in the flow region, the scattered laser light then undergoes a Doppler frequency shift which is inversely proportional to the vacuum wavelength of the laser light and directly proportional to the optical refractive index of the flowing medium and the value and the direction cosine of the velocity of the scattering particles. In order to measure this frequency shift, the unscattered and a scattered beam are focused through mirrors, jointly on a spot of a light detector, for example, the photocathode of a photomultiplier or a photodiode, as a result of which there is obtained the beat-signal of the unscattered and the scattered beams (heterodyne signal). The frequency of the heterodyne signal lies within the kcps or Mcps range depending on the flow velocity and can therefore be processed electronically. Further details and examples of embodiment are described, for example, in IEEE Journal of Quantum Electronics, 1966, 260–266.

The spatial resolution of a Doppler flow probe, that is to say, the smallest spatial region of the flow field which can still be measured separately, is determined essentially by the dimensions of the volume within which the laser beam can be focused. According to the laws of optics (for example Born-Wolf "Principles of Optics," Pergamon Press, 3rd. edition, pages 439–441, or E. Rolfe et al., "Laser Doppler Velocity Instrument" NASA Contractor Report, NASA CR-1199, 2.13-1 to 2.13-4), this depends on the wavelength of the laser light and the aperture ratio number of the measuring optical system, and may be of the order of magnitude of $10^{-6}$ mm$^3$. All flow particles which pass through this volume (measuring volume) scatter a Doppler pulse in the measuring device during the time which they remain.

In the measuring devices hitherto known, it was regarded as unalterable that the spatial resolution could not be improved beyond the focusing volume defined above and acting as a measuring volume. A reduction in the optical focusing volume was regarded as the only possibility of reducing the measuring volume.

In contrast, the invention achieves a reduction in the effective measuring volume, and hence a considerably higher definition in the flow measuring probe, by electrical means, as a result of the fact that, during the frequency analysis of the heterodyne signals by means of electronic amplitude discrimination, only the frequency of the signals of a specific amplitude is measured.

The invention utilizes the effect that the intensity of the light decreases sharply from the center towards the outside in the focusing volume. In the immediate vicinity of the center of the focusing volume, the intensity distribution is a definite function of the distance. As a result, the Doppler pulses scattered by the particles passing through the volume have higher or lower amplitudes depending on whether the particle passes more through the center or the marginal region of the measuring volume. Whereas hitherto during the frequency measurement of the heterodyne signal, there was integration over all the amplitudes and the mean value of the frequency for all amplitudes was determined, according to the invention the frequencies associated with amplitudes of a specific magnitude are measured selectively. As a result, only the regions of the focusing volume to which the particular amplitude corresponds are included in the measurement.

Thus, there is a considerable reduction in the measuring volume. In addition, if the frequency is considered depending on the amplitude distribution, the local distribution of the velocity field can be examined within the focusing volume. If the focusing volume is deliberately selected large, this would also afford the possibility of investigating relatively large spatial elements of the flow in the manner described.

According to an appropriate embodiment of the invention, only the frequencies of the signals, the amplitudes of which exceed a specific, adjustable level, are measured. In this manner, only the central region of the focusing volume is detected, in a magnitude which is adjustable.

It is clear that, with the method according to the invention, the minimum size of the measuring volume, that is to say the resolution of the laser Doppler flow probe, is limited only purely electronically by the fact that the received signal which is separated by discrimination can still be measured with regard to its frequency.

The invention is explained in more detail below with reference to an example of an embodiment illustrated in Figures. In this case:

Figure 1:
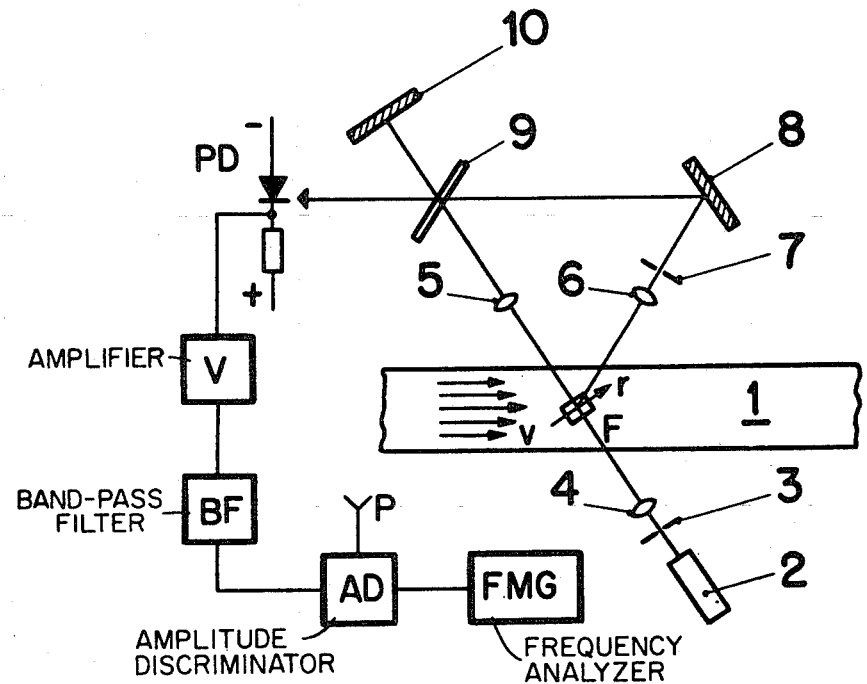
FIG. 1 shows diagrammatically one possible measuring device.

In FIG. 1, a medium 1 flowing in the direction $v$ is represented, which is illuminated with the light of a continuous-wave laser 2. A diaphragm 3 limits the laser beam and a lens 4 focuses it on the volume F within the liquid. The volume F extends perpendicular to the laser beam in the direction $r$.

A component beam emerges from the volume F unscattered towards the lens 5 while a scattered component beam emerges to the lens 6. The lenses 5 and 6 focus the scattered beams on the detection section of a photodiode PD, after the component beams have passed through the splitter 9 or have been reflected on this and the mirrors 8, 10. In addition, a diaphragm 7 is also provided (to limit the scattered beam).

So far, the arrangement corresponds completely to the measuring arrangement according to the aforementioned IEEE article. The output of the measuring arrangement also corresponds fundamentally to the known arrangement.

The heterodyne signals appearing at the photodiode PD are supplied to a frequency measuring instrument with indication of the measured value FMG, for example, a commercial spectrum analyzer, or a device as shown in FIG. 11 of the aforementioned article where they are measured with regard to their frequency.

In distinction from the known arrangement, however, the heterodyne signals pass to the frequency measuring instrument FMG through a pulse height analyzer or amplitude discriminator AD. Such amplitude discriminators are known and are therefore not explained in more detail. In addition, an amplifier V and a band-pass filter BF are mounted between the photodetector FD and the amplitude discriminator AD.

If a so-called integral discriminator is selected as an amplitude discriminator, then only the signals, the amplitudes of which are above a level P which can be set at the discriminator are measured.

Figure 2:
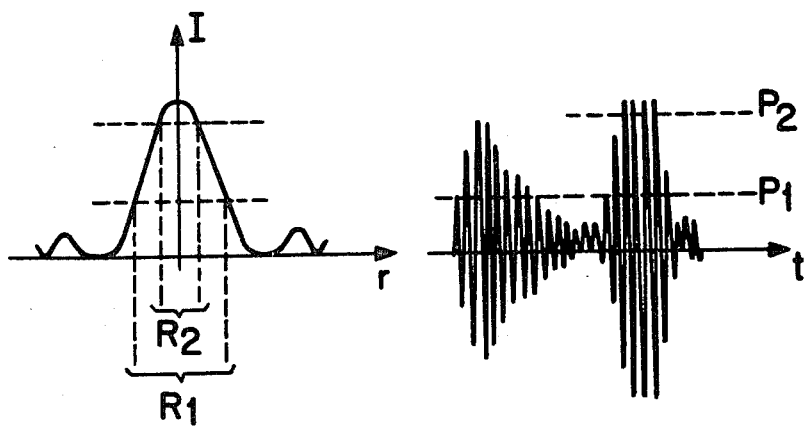
FIG. 2 shows diagrammatically, on the left the representation of the intensity of the light in the focusing volume, and on the right an example of a signal train of a heterodyne signal to be measured by means of the measuring device shown in FIG. 1.

Then the conditions illustrated in FIG. 2 are obtained:

In FIG. 2, on the left, the intensity of the light in the focal plane of the focusing volume F is illustrated diagrammatically. It can be seen that the intensity decreases greatly as the distance $r$ increases from the center of the focusing volume. The amplitude of the heterodyne signals appearing at the photodiode PD (FIG. 1) are then the greater, as can be seen, the shorter the distance $r$ of the scattering particle from the center of the focusing volume. Since the passage of scattering particles through the focusing volume is statistical, statistical amplitude distributions are obtained over the time $t$, as shown in FIG. 2, right. From FIG. 2, right, which is drawn from a measured oscillogram, it is also clear that the frequencies for signals of lower amplitude are different from the frequency of signals of a higher amplitude. This is based on the fact that the scattering particles having high values of $r$ during the measurement have a different velocity from those in the center.

If the discriminator level of the apparatus AD is set to $P_2$, then only the signals which are being caused by particles which have travelled substantially through a central region with the extent $R_2$ enter the device FMG for the frequency measurement. This central region then represents the effective measuring volume. On the other hand, if the level is set to $P_1$, then signals are also detected from particles which have travelled through the focusing volume in the region $R_1$. The measuring volume is, however, always made smaller than the focusing volume F by the electronic amplitude discrimination.

The device AD may also be constructed in the form of a single-channel or multi-channel discriminator. Then signals of specific amplitudes can be selected and various regions can be picked out from the focusing volume by the frequency measurement of the signals associated with one channel.

I claim:

1. A method of microscopic measurement of velocities in a flow field which comprises the steps of focusing a laser beam of a predetermined frequency on a selected volume of a fluid medium flowing in a field and which thereby produces an unscattered component beam as well as a scattered component beam, collecting both of said component beams and mixing their frequencies to produce a corresponding electrical heterodyne signal, subjecting said electrical signal to a discriminating function to eliminate all signal components below a preselected amplitude level to thereby correspondingly improve the spatial resolution of the volume of fluid desired to be measured and measuring the frequency of the signals above said preselected amplitude level.

2. Apparatus for microscopic measurement of velocities in a flow field which comprises means producing a laser beam of a predetermined frequency, means focusing said laser beam on a selected volume of fluid flowing in a field which thereby produces an unscattered component beam as well as a scattered component beam, a photodetector, means directing said unscattered and scattered component beams onto said photodetector in which their respective frequencies are mixed to produce at the output thereof a corresponding electrical heterodyne signal, circuit means connecting the output from said photodetector to an amplitude discriminator to delete all signals below a preselected amplitude level to thereby correspondingly improve the spatial resolution of the volume of fluid desired to be measured, and circuit means applying the output from said discriminator to a frequency measuring instrument.

3. Apparatus as defined in claim 2 and which further includes a band-pass filter inserted in the circuit means extending from the output of said photodetector to said amplitude discriminator.

* * * * *